US010412045B1

United States Patent
Kaliski, Jr. et al.

(10) Patent No.: US 10,412,045 B1
(45) Date of Patent: *Sep. 10, 2019

(54) DOMAIN NAME REGISTRATION RESERVATION THROUGH THE USE OF ENCODING DOMAIN NAMES FOR POOLS

(71) Applicant: VERISIGN, INC., Reston, VA (US)

(72) Inventors: Burton S. Kaliski, Jr., McLean, VA (US); Joseph Waldron, Herndon, VA (US)

(73) Assignee: VERISIGN, INC., Reston, VA (US)

( * ) Notice: Subject to any disclaimer, the term of this patent is extended or adjusted under 35 U.S.C. 154(b) by 197 days.

This patent is subject to a terminal disclaimer.

(21) Appl. No.: 15/489,112

(22) Filed: Apr. 17, 2017

Related U.S. Application Data

(63) Continuation of application No. 15/488,984, filed on Apr. 17, 2017.

(51) Int. Cl.
  *H04L 9/06* (2006.01)
  *H04L 29/12* (2006.01)

(52) U.S. Cl.
  CPC .......... *H04L 61/302* (2013.01); *H04L 9/0643* (2013.01); *H04L 61/1511* (2013.01); *H04L 61/303* (2013.01); *H04L 61/305* (2013.01); *H04L 61/3015* (2013.01); *H04L 61/3025* (2013.01); *H04L 61/3055* (2013.01)

(58) Field of Classification Search
  CPC combination set(s) only.
  See application file for complete search history.

(56) References Cited

U.S. PATENT DOCUMENTS

| 7,188,138 B1* | 3/2007 | Schneider | G06Q 30/02 709/203 |
| 7,565,402 B2* | 7/2009 | Schneider | H04L 29/12594 709/203 |
| 7,904,898 B2* | 3/2011 | King | H04L 29/12009 717/121 |

(Continued)

OTHER PUBLICATIONS

Verisign Global Registry Services. "Domain Name Wait Listing Service", Mar. 20, 2002, 10 pages. (Year: 2002).*

(Continued)

*Primary Examiner* — George C Neurauter, Jr.
(74) *Attorney, Agent, or Firm* — MH2 Technology Law Group, LLP

(57) ABSTRACT

A technique for facilitating registration of an internet domain name with the domain name system (DNS) is presented. The technique can include receiving a request to register an encoding domain name with the DNS, where the encoding domain name includes an indication of a temporal event and of a pool of domain names. The technique can also include registering the encoding domain name to a registrant, thereby conferring to the registrant a right to register a target domain name of the registrant's selection from the pool of domain names upon specified conditions, where the specified conditions include an occurrence of the temporal event. The technique can also include receiving a request initiated by the registrant to register the target domain name. The technique can also include registering the target domain name to the registrant after satisfaction of the specified conditions.

20 Claims, 4 Drawing Sheets

(56) References Cited

U.S. PATENT DOCUMENTS

| | | | |
|---|---|---|---|
| 8,738,776 B2* | 5/2014 | Young | G06Q 30/08 |
| | | | 705/26.3 |
| 2004/0172463 A1 | 9/2004 | King et al. | |
| 2007/0130284 A1 | 6/2007 | Stahura | |
| 2007/0271393 A1 | 11/2007 | Wong | |
| 2008/0005127 A1* | 1/2008 | Schneider | H04L 29/12594 |
| 2016/0285836 A1 | 9/2016 | Kaliski, Jr. | |
| 2018/0103008 A1* | 4/2018 | Slaunwhite | H04L 61/3025 |
| 2018/0351910 A1* | 12/2018 | Zhou | H04L 61/302 |

OTHER PUBLICATIONS

Verisign Global Registry Services. "VeriSign GRP Responses to Domain Name Wait Listing Service Questions", Feb. 15, 2001, 25 pages. (Year: 2001).*

Team, Trefis. "VeriSign: The New Domain Name Game", retrieved from Forbes.com, Oct. 15, 2015, 4 pages. (Year: 2015).*

ICANN. "ICANN Bucharest Meeting Topic: VGRS Proposal for Wait-Listing Service", posted to icann.org on May 19, 2002, 5 pages. (Year: 2002).*

Crazy Domain Names. "Backorder Domain", originally posted Mar. 6, 2017, retrieved from archive.org at <https://web.archive.org/web/20170306212956/https://www.crazydomains.com/domain-names/back-order/>, 4 pages. (Year: 2017).*

Extended European Search Report dated Aug. 23, 2018, European Application No. 18167711.3.

* cited by examiner

DOMAIN NAME REGISTRATION RESERVATION THROUGH THE USE OF ENCODING DOMAIN NAMES FOR POOLS

RELATED APPLICATION

This application is related to application Ser. No. 15/488,984, entitled "Domain Name Registration Reservation Through the Use of Encoding Domain Names", filed concurrently herewith.

FIELD

This disclosure relates generally to registering internet domain names.

BACKGROUND

The domain name system ("DNS") is a hierarchical distributed naming system for resources provided by computer servers that are connected to the internet. It associates domain names to numeric internet protocol ("IP") addresses of internet resources, including resources managed by web hosting providers, which provide the web server computers that serve the web pages associated with domain names. The DNS thus allows computers and humans to access networked resources, including web pages, using names.

The DNS uses "resource records", which are persistently stored, formatted data structures that include information relevant to performing DNS tasks. For example, IP addresses are specified by DNS "A" or "AAAA" resource records, which include both a domain name and the associated IP address for the computer server that hosts the domain, i.e., the web hosting provider.

A DNS "registry" is an authoritative, master database of all domain names registered in a top-level domain or other domain in which domain names can be registered. A registry includes many hardware computer servers operably coupled to the internet. A registry keeps the master database and also generates a "zone file" comprising DNS resource records for the top-level domain, which allows computers to look up DNS records in the top-level domain from anywhere in the world. Internet users generally interact with the registry via intermediaries. For ease of discussion, a registry is identified with its hardware computer servers unless otherwise specified or clear from context.

SUMMARY

According to various embodiments, a method of facilitating registration of an internet domain name with the domain name system (DNS) is presented. The method includes receiving a request to register an encoding domain name with the DNS, the encoding domain name including an indication of a temporal event and of a pool of domain names; registering the encoding domain name to a registrant, where the registering the encoding domain name confers to the registrant a right to register a target domain name of the registrant's selection from the pool of domain names upon specified conditions, where the specified conditions include an occurrence of the temporal event; receiving a request initiated by the registrant to register the target domain name; and registering the target domain name to the registrant after satisfaction of the specified conditions.

Various optional features of the above embodiments include the following. The temporal event may include expiration of prior registrations of domain names in the pool of domain names. The specified conditions may include prior registrants of domain names in the pool of domain names agreeing to relinquish registration of the domain names in the pool of domain names. At least one user distinct from the registrant may have a right to register a domain name of the at least one user's selection from the pool of domain names with a higher priority than a priority of the registrant's right to register a target domain name of the registrant's selection from the pool of domain names; and the specified conditions may include the at least one user not requesting to register the target domain name. The indication may include a reference to a database entry, where the database entry includes an identification of the pool of domain names and an identification of the temporal event. The indication may include a cryptographic hash of data including an identification of the pool of domain names and an identification of the temporal event. The temporal event may include a time of a release of new domain names for registration. The indication may include a tokenization of at least one of: an identification of the pool of domain names or an identification of the temporal event. The specified conditions may include a passing of the temporal event. The specified conditions may include not passing the temporal event.

According to various embodiments, a system for facilitating registration of an internet domain name with the domain name system (DNS) is presented. The system includes a first network interface configured to receive a request to register an encoding domain name with the DNS, the encoding domain name including an indication of a temporal event and of a pool of domain names; at least one electronic processor configured to register the encoding domain name to a registrant, where registering the encoding domain name confers to the registrant a right to register a target domain name of the registrant's selection from the pool of domain names upon specified conditions, where the specified conditions include an occurrence of the temporal event; a second network interface configured to receive a request initiated by the registrant to register the target domain name; and at least one electronic processor configured to register the target domain name to the registrant after satisfaction of the specified conditions.

Various optional features of the above embodiments include the following. The temporal event may include expiration of prior registrations of domain names in the pool of domain names. The specified conditions may include prior registrants of domain names in the pool of domain names agreeing to relinquish registration of the domain names in the pool of domain names. At least one user distinct from the registrant may have a right to register a domain name of the at least one user's selection from the pool of domain names with a higher priority than a priority of the registrant's right to register a target domain name of the registrant's selection from the pool of domain names; and the specified conditions may include the at least one user not requesting to register the target domain name. The indication may include a reference to a database entry, where the database entry includes an identification of the pool of domain names and an identification of the temporal event. The indication may include a cryptographic hash of data including an identification of the pool of domain names and an identification of the temporal event. The temporal event may include a time of a release of new domain names for registration. The indication may include a tokenization of at least one of: an identification of the pool of domain names or an identification of the temporal event. The specified conditions may include a passing of the temporal event. The specified conditions may include not passing the temporal event.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

According to some embodiments, an internet user can reserve a domain name for later registration under certain conditions as explained herein. For example, some embodiments permit an internet user to reserve registration of a specific domain name that is already registered to another, once that domain name becomes available. Such a domain name may become available by way of the existing registration's expiration or by way of an existing registrant relinquishing his or her registration, for example. "Reservation" is thus understood as obtaining and/or indicating a right or intent to register a domain name via a subsequent transaction. Further, some embodiments allow an internet user to reserve a priority for selecting and registering a domain name from among a "pool" of domain names. Yet further, some embodiments affect domain name reservations by way of an "encoding domain name". In some such embodiments, registering an encoding domain name confers a right to register a "target domain name" that is recited in, or referenced by, the encoding domain name. In other such embodiments, registering an encoding domain name confers a right to select with a known priority, and register, a domain name from a pool of domain names that is indicated by the encoding domain name. Thus, an internet user can reserve registration of a target domain name by registering a corresponding encoding domain name, and subsequently executing the rights conferred thereby.

Note that a user may transfer the user's registration reservation of a target domain name to another user by transferring registration of the encoding domain name following established methods for domain name management. Such transfers of encoding domain names can provide a convenient way for domain name registrants to manage present and future rights to domain names. Further, such transfers are more efficient than existing direct domain name reservation transfers, which may require special-purpose transactions with the registry and/or between users. These and other embodiments are disclosed in detail herein.

Figure 1:
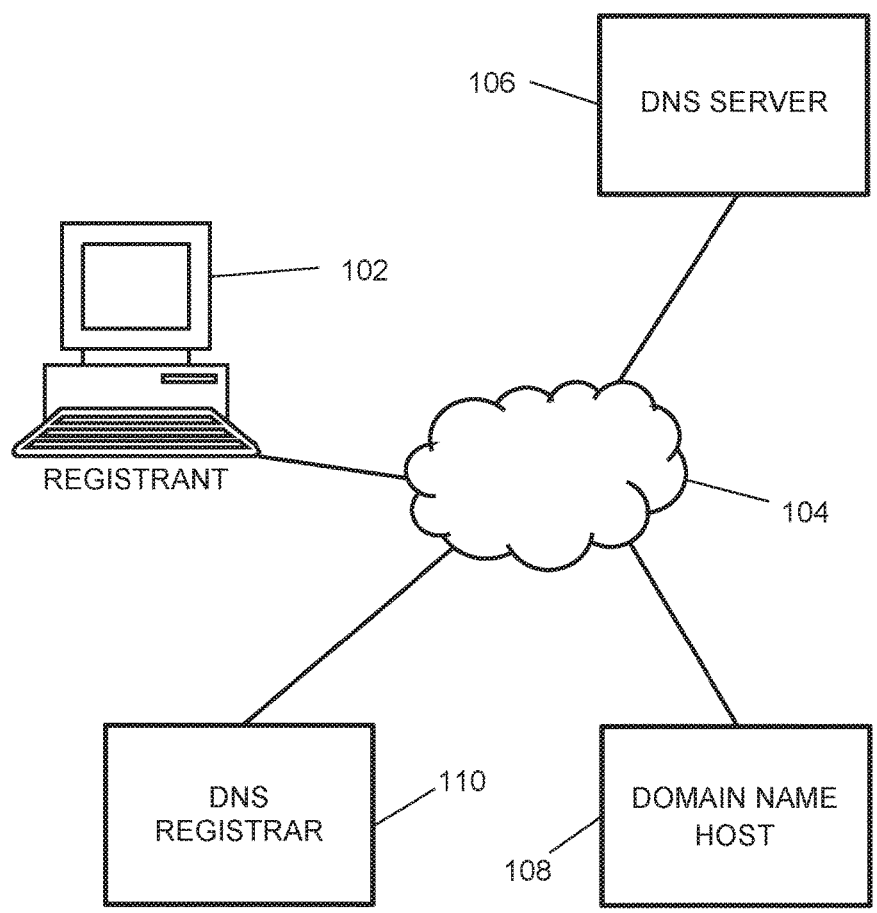
FIG. 1 is a schematic diagram illustrating a portion of the domain name system ("DNS") according to some embodiments.

FIG. 1 is a schematic diagram illustrating a portion of the domain name system ("DNS") according to some embodiments. As depicted in FIG. 1, a domain name (e.g., www.example.com) can be registered to an internet user known as a "registrant" 102 by a company known as a "registrar" 110. In general, registrars compete with one another to register domain names for registrants. An internet user interacts with a registrar 110 through the internet 104 to obtain a domain name, thereby becoming a registrant 102 for the domain. The registrar 110 asks the registrant 102 to provide various contact and technical information for the registration. The registrar 110 then keeps a record of the contact information and submits the technical information to the DNS registry (not shown).

When any internet user (not shown) attempts to navigate his or her browser to the registered domain through internet 104, the browser contacts a DNS server 106, which provides an IP address for the domain name host 108 of the registered domain by looking up an appropriate DNS resource record for the domain name. The internet user's browser then navigates to the domain name host 108 using its IP address to retrieve the resource of the domain name, e.g., content.

For ease of discussion, a registrar is identified with its hardware computer servers unless otherwise specified or clear from context. Further, an internet user has a hardware client computer. For ease of discussion, a registrant (e.g., registrant 102) is identified with his or her hardware client computer unless otherwise specified or clear form context.

Figure 2:
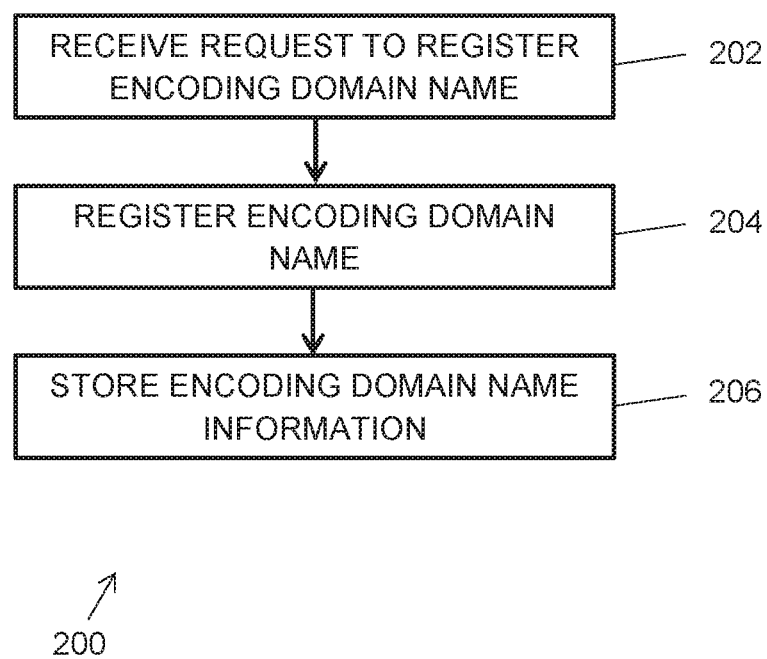
FIG. 2 is a flowchart of a method for reserving registration of a domain name according to some embodiments.

FIG. 2 is a flowchart of a method 200 for reserving registration of a domain name according to some embodiments. In particular, FIG. 2 schematically depicts a method 200 for registering an encoding domain name. As presented herein, registering an encoding domain name reserves a target domain name (which may be selected subsequent to the registration of the encoding domain name) by conferring to the registrant a right to register the target domain name at a later time. Method 200 may be implemented on a network-connected server computer, such as at a registry or registrar (e.g., registrar 110 of FIG. 1).

Encoding domain names can indicate relevant information about a corresponding target domain name (or pool of domain names from which a registrant may select a target domain name) and/or other information. As used herein, the term "indicate" means to include or to include one or more references to. With that understanding, encoding domain names can include, or include one or more references to, relevant information about a corresponding target domain name, or pool of domain names.

According to some embodiments, the encoding domain name indicates the domain name reservation rights that its registration confers. For example, an encoding domain name may indicate the letters "dn" to establish that registration of the encoding domain name reserves, for the registrant, a single pre-selected indicated target domain name for registration. That is, such encoding domain names confer a right to register a target domain name, which is selected prior to registering the encoding domain name. An ending domain name may indicate the letters "pl" to establish that registration of the encoding domain name reserves, for the registrant, the selection and registration of a single target domain name in a pool of indicated domain names. That is, such encoding domain names confer a right to register a target domain name, which the registrant selects from a pool of domain names subsequent to the registration of the encoding domain name. Note that the specific letters used are exemplary; other letters or symbols may be used to indicate rights conferred by registering an encoding domain name.

According to some embodiments, for encoding domain names which registration reserves a single pre-selected target domain name, the encoding domain name may further indicate the target domain name itself. Thus, the encoding domain name may indicate both "cn" and "example.com", for example, to indicate that the encoding domain name confers a right to register example.com, which is already registered to another user, on an indicated date. The user to which example.com is already registered may agree to relinquish his or her registration on the indicated date. As another example, an encoding domain name may indicate both "dn" (described above) and "example.com", for example, to indicate that the encoding domain name confers a right to register example.com, which is already registered to another user, upon expiration of the existing registration. Note that, in general, domain names that become available for registration because their existing registration has expired are said to be "deleted" by a corresponding registrar during a deletion event. Thus, registration of this example encoding domain name confers a right to register example.com upon its deletion.

According to some embodiments, for encoding domain names which registration reserves, for the registrant, the right to select and register a single target domain name from among a pool of domain names, the encoding domain name may further indicate the pool of domain names. Such a pool may be, e.g., all domain names which registrations are to be deleted on a certain day at a certain time. The indication of the pool may be of the date, possibly together with a time, upon which the deletion event is to occur. Thus, an encoding domain name may indicate both "pl" and "20170326" to express that registration of the encoding domain name confers a right to select and register a domain name that is to be deleted on Mar. 26, 2017. Other pools are possible. For example, registries sometimes make new top-level domains available, providing for a large number of possible domains for registration. Some embodiments permit encoding domain names to reserve a right to select and register a domain name from a pool of domain names within one or more new top-level domains once they are available for registration, e.g., in a "launch" phase. Such embodiments may indicate the pool in the corresponding encoding domain name, e.g., by indicating the new top-level domain. Thus, an encoding domain name may indicate both "ntld" and "20170327" to express that registration of the encoding domain name confers a right to select and register a new domain name within the new top-level domain "ntld" on Mar. 27, 2017. Note that the term "ntld" as used herein is meant to be any new top-level domain. Pools may also be defined for existing top-level domains, e.g., when domain names previously "reserved," i.e., held back, by a registry are made available for broader registration. Yet other pools are possible, not limited to the examples set forth herein. According to some embodiments, essentially any definable plurality of domain names may be considered a "pool".

For encoding domain names that confer a right to select and register a domain name from among a pool of domain names, the encoding domain name may indicate a priority of such right. Here, "priority" expresses an order. Thus, an encoding domain name may indicate a first priority, or a second priority, or a third priority, etc. When the pool of domain names becomes available for registration, the registrant of the encoding domain name that indicates a first priority gets the first selection of a target domain name for registration from among the pool of domain names. The registrant of the encoding domain name that indicates a second priority gets the second selection of a target domain name for registration from among the pool of domain names, and the registrant of the encoding domain name that indicates a third priority gets the third selection. And so on. Users with lower priority may wait until users with higher priority have selected from the pool or pass on the opportunity to do so.

Note that, instead of an encoding domain name indicating a domain name itself, either by explicitly including the domain name string or by including a reference thereto, in some embodiments, the encoding domain name instead indicates an extensible provisioning protocol ("EPP") registration identification in place of a domain name indication. In general, EPP may be used to register domain names. Upon registering a domain name using EPP, a unique receipt identification is provided according to the protocol. Some embodiments utilize this EPP-provided identification of a target domain name in the encoding domain name, instead of the target domain name itself. Similarly, some embodiments utilize EPP-provided identification of a pool of domain names from which a target domain name may be selected.

According to some embodiments, an encoding domain name can indicate one or more temporal events, e.g., by way of time and date information. Alternately, or in addition, an encoding domain name can indicate a temporal event by way of a description or code, e.g., an indication of a daily domain name deletion event. Indicated temporal events may be any of several kinds. The indicated temporal event may be a time and date by which the encoding domain name must be exercised, that is, redeemed for a corresponding target domain name registration. Such a temporal event may be characterized as an expiration of the encoding domain name. The indicated temporal event may be a time and date after which the encoding domain name may be exercised, but not before. The indicated temporal event may be a date, or timespan, during which the encoding domain name may be exercised, but not outside of the date or timespan. Examples of temporal events include deletion events and registrant registration relinquishment, as set forth above, among other places herein.

Yet other information may be indicated in an encoding domain name. Examples of such information follow. An encoding domain name may indicate a price for exercising the encoding domain name, i.e., registering the corresponding target domain name. Such a price may be on top of a standard domain name registration price, for example. Such a price may be instituted for embodiments that permit selection of a domain from a pool for registration. An encoding domain name for a pool of domain names may indicate a selection priority, as described above. Other examples may be indicated in an encoding domain name, not limited to the explicit examples provided herein.

The information indicated by an encoding domain name may be indicated in any of several ways. According to some embodiments, the information is literally included in the encoding domain name itself. Such information may appear in designated fields. For example, an encoding domain name that reserves a right to register example.com upon its deletion on Mar. 28, 2017 may be written as, for example, "dn--example-20170328.com". (The inclusion of a double dash "--" in the third and fourth positions is an exemplary way of distinguishing an encoding domain name syntactically from an ordinary domain name.) An encoding domain name that reserves a right to register example.com on Mar. 29, 2017 even though another user has a current registration of that domain may be written as, for example, "cn--example.com-20170329.com". An encoding domain name that reserves a first-priority right to select and register any domain name deleted on Mar. 26, 2017 may be written as, for example, "dp--20170326-1.com". An encoding domain name that reserves a second-priority right to select and register a new top-level domain dot ntld once such domains are released for registration may be written as, for example, "dp--ntld-02.com". Note that, because in this latter case ntld domains are not registerable at the time that a user would register an encoding domain name, the encoding domain name may have a different top-level domain from the pool of domain names. This is in contrast to the other types of encoding domain names, which may share the same top-level domain as their corresponding target domain name or pool of domain names, or have a dedicated top-level domain for all encoding domain names (e.g., dot verisign). Note further that the format of these example encoding domain names is not limited to the formats disclosed herein.

According to some embodiments, encoding domain names include references to their respective indicated information instead of literally including it. In such embodiments, the encoding domain names may include database keys, for example. The database may be electronically stored, e.g., at a registrar or registry. Each database key may refer to a row in the stored database that includes the indicated information. This technique for indicating information by references within encoding domain names may store, in the respective database row, the same information that would be literally included in an encoding domain name in embodiments that literally include the information in the encoding domain names.

According to some embodiments, encoding domain names indicate their respective information by literally including the results of applying a cryptographic hash (e.g., one-way function) to the information itself. The application of a hash function can be designated by the characters "ch" for example, yielding "ch--9a4203f99188d455777b9b3ed15361f0225ba177503d6ee3-f6b9008daff4d944.com" as an example encoding domain name, where "9a4203f99188d455777b9b3ed15361f0225-ba177503d6ee3f6b9008daff4d944" is a hash of "dn--example-20170328.com" provided by the known SHA-256 cryptographic hash algorithm, represented in hexadecimal. This technique hides the information from other users due to the one-way nature of cryptographic hash functions. Relying parties can test whether encoding domain names with specific indicated information exist by checking for corresponding registrations. However, relying parties cannot directly learn the indicated information from the encoding domain name itself, except by brute-force trial-and-error hashing.

According to some embodiments, encoding domain names indicate their respective information by literally including the results of applying a cryptographic hash (e.g., one-way function) to the information itself, as described above, combined with a random number. That is, such embodiments may concatenate the information with a random number and hash the resulting string. In such embodiments, because of the presence of the random number, relying parties cannot test whether encoding domain names with specific contract terms exist by checking a registration status. Neither can relying parties learn of the indicated information from the encoding domain name itself. However, the random number may be "decommitted" during transactions to confirm the association of the indicated information with the encoding domain name, but such information would not necessarily be made public.

According to yet further embodiments, encoding domain names indicate their respective information in tokenized form. Here, a "token" for data means the results of applying an tokenizing function together with a secret key, where the tokenizing function may be an encryption function or a pseudorandom function, to the data. The tokenizing function may be reversible or irreversible. The application of a tokenizing function and key may be expressed symbolically as TOKEN=$F_K$(DATA), where "TOKEN" is the token that results from applying the tokenizing function "F" with secret key "K" to data "DATA". The usage of tokens may be expressed by the inclusion of the letters "ct" for example. Thus, according to such embodiments, "ct--7a04d0eca940180036e6f426d14d803e54284deaaae64-959.com" is an example encoding domain name resulting from applying a tokenizing function and secret key to the string "dn--example-20170328.com". In these embodiments, the tokenizing function may be implemented by a trusted online service, and may have access controls. Relying parties can search for encoding domain names with specific elements using a tokenized search queries, for example. Relying parties can also learn the indicated information from the encoding domain name by untokenizing the tokenized data, if the tokenizing function is reversible.

The various disclosed techniques by which encoding domain names may indicate their information may be combined. For example, some data may be literally included in the encoding domain name for convenience (e.g., initial characters or all of the target domain name, priority, price), while other data may be represented by reference, hashed, hashed with a random number, or tokenized. Hashing and hashing with a random number could also be combined with tokenization, e.g., a hash of data and/or random number may be input to a tokenization function. Such combinations may balance privacy and disclosure with respect to certain applications.

Figure 3:
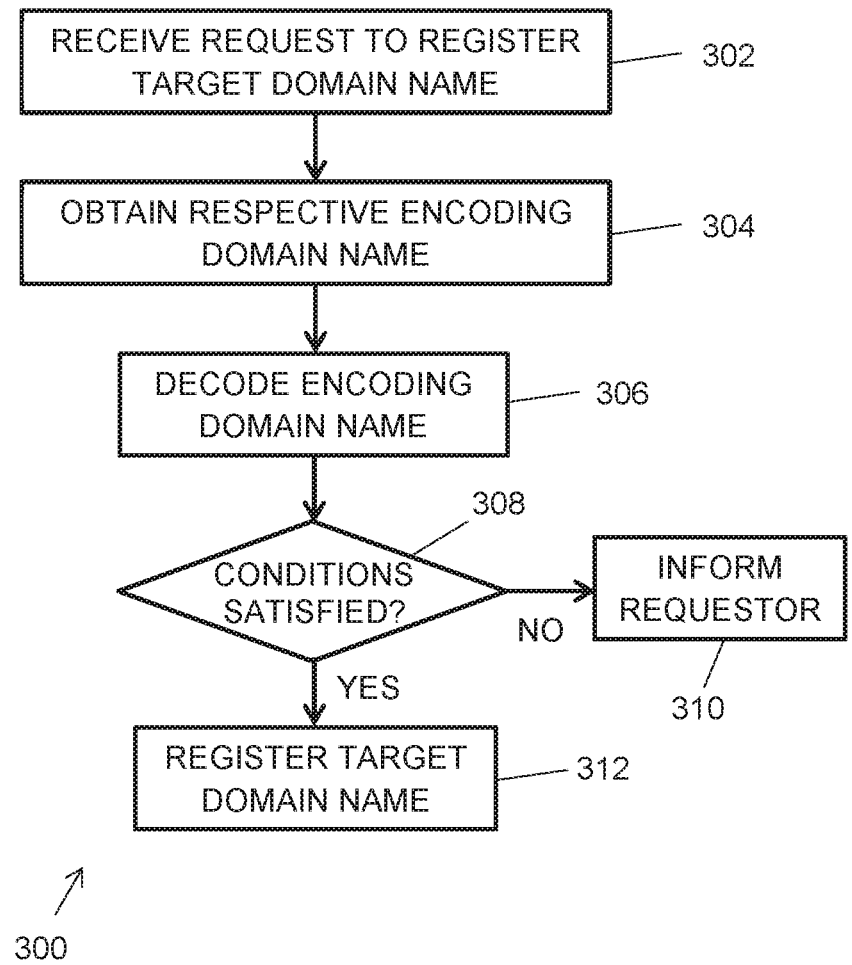
FIG. 3 is a flowchart of a method for registering a target domain name through the use of a corresponding encoding domain name.

Thus, various encoding domain names, the rights they confer, and their encodings have been presented. With this material understood, its usage with respect to the flow diagrams of FIGS. 2 and 3 is set forth presently.

At block 202 of FIG. 2, method 200 receives a request to register an encoding domain name. The system may receive the request at a website provided by a registrar or registry, for example. The request may be received through a user interface present on a website. The request may be issued using EPP or HTTP, for example. Other expedients for receiving the request to register the encoding domain name are also contemplated.

There are two primary ways of receiving the request of block 202. The first way is for a registrant of the encoding domain name to specify the rights that he or she wants the encoding domain name to confer, and the system forms a corresponding encoding domain name for registration. In such embodiments, a graphical user interface may include a field for entering a target domain name, if applicable, and radio buttons, for example, for choosing the type of associated rights. The graphical user interface may also include a field to enter, or buttons to select, a temporal event, such as a deletion event. The graphical user interface may include a field to enter, or buttons to select, an identification of a pool of domain names. The graphical user interface may include a field to enter, or buttons to select, a new top level domain.

The graphical user interface may include a field to enter, or buttons to select, a priority, e.g., as a numeral. The graphical user interface may include or be linked to an interface for accepting payment from the user. (Note that a graphical user interface is exemplary; other user interfaces, e.g., voice interfaces, may also be employed.) Once the user specifies the rights that he or she intends for the encoding domain name to confer, the system formulates a corresponding encoding domain name, which registration confers the requested rights. The system may automatically encode the encoding domain name consistent with system configurations for literal information inclusion, inclusion by reference to a database key, inclusion of hashed data, inclusion of hashed data with a random number, or inclusion of tokenized data, as presented herein above. Thus, for embodiments that encode encoding domain names by inclusion of a reference such as a database key, the system may formulate the appropriate data, store it in a database, and provide an encoding domain name that includes a corresponding reference. For embodiments that encode encoding domain names by inclusion of hashed or tokenized data, the system may formulate the appropriate data and provide an encoding domain name that includes a hash or tokenization of the data, respectively. For embodiments that encode encoding domain names by inclusion of the data hashed together with a random number, the system may formulate the appropriate data and provide an encoding domain name that includes the results of the data being concatenated with a random number and then hashed. The system may include a random number generator for supplying the random number. The system may also provide the random number to the user for reference in later transactions. The system may present the domain name to the user by causing it to be displayed, for example.

The second primary way that the system may receive a request to register an encoding domain name is for the user him- or herself to formulate the encoding domain name and provide it to the system. The user may consult system-provided online guidance documents, with information similar to that disclosed herein, for assistance in determining the correct encoding domain name for the user's desired rights. For systems that encode encoding domain names by literal information inclusion, the user may formulate a final version of an encoding domain name and provide it to the system. For systems that encode encoding domain names by inclusion of a reference such as a database key, the system may accept the user's data and provide a corresponding reference for inclusion in an encoding domain name for registration. For systems that encode encoding domain names by inclusion of hashed or tokenized data, the system may accept the user's data and provide a hash or tokenized output, respectively, for inclusion in an encoding domain name for registration. For systems that encode encoding domain names by inclusion of hashed data that includes a random number, the system may accept the user's data and provide an output of a hash of the data concatenated with a random number, which may be generated or provided by the user by the system, for inclusion in an encoding domain name for registration.

At block 204, method 200 registers the encoding domain name for which a registration request was received at block 202. For embodiments that are operated by a registry, the registry itself may perform the registration. For embodiments that are operated by a registrar, the registrar may register the domain name with an appropriate registry consistent with the normal operation of the registrar.

At block 206, method 200 forms and electronically stores a record of the data encoded in the encoding domain name. Note that such a record may be separate from any DNS record(s) of the encoding domain name itself kept by the registry and DNS for the encoding domain name's registration. This separate record is particularly useful in systems that implement encoding by the inclusion of a reference, by the inclusion of hashed data, by the inclusion of data hashed together with a random number, or by the inclusion of tokenized data, because the data is obscured in the encoding domain names in such embodiments such that the conferred rights cannot readily be determined by inspecting the encoding domain name. Moreover, these separate records may be searched to obtain all encoding domain names that affect the registration of a particular target domain name or pool of domain names, i.e., all encoding domain names that provide a registration right for a particular target domain name or pool of domain names. Thus, relying parties can look up encoded data for a given encoding domain name, and search for encoded domain names with certain elements, e.g., to answer questions such as: What are the terms for <particular_encoding_domain_name>? What deletion pool encoding domain names have been registered for <particular_target_domain_name>? What deletion pool encoding domain names have been registered for <particular_date>? To accomplish this, the information may be stored in a database, with each row representing a different encoding domain name. A database column may store an identification of a target domain name for efficient searching (discussed below in reference to block 304 of FIG. 3). Other database columns may be designated for, e.g., target domain name, expiration date, execution date, pool identification, etc. A user may thus search for an encoding domain name in the separate database, and then search the registry for the encoding domain name's registration in order to determine whether anyone has reserved a particular right. According to some embodiments, it is not necessary, and may not be desirable, for the database to include complete records for every encoding domain name and/or target domain name. In particular, some transactional information may be kept private, for example in the case involving hashed data with a random number, where the target domain name may not be revealed by a user until the random number is "decommitted."

FIG. 3 is a flowchart of a method 300 for registering a target domain name through the use of a corresponding encoding domain name. Method 300 may be implemented using the same hardware as method 200. Alternately, method 200 and 300 may be implemented using different hardware. Method 300 may be practiced by a registry or registrar, for example.

At block 302, method 300 receives a request to register a target domain name. Embodiments may supply graphical user interfaces for receiving the request. The request may be sent using EPP or HTTP, for example. Other expedients for receiving the request to register the encoding domain name are also contemplated. The request may be in any of several forms. For example, the request may be a standard request to a registrar to register a specific target domain name. The request may be a special request to register a target domain name that is selected from a pool of domain names. In such instances, the request may provide an ordered list of domain name selections from the pool. In such cases, if the user's initial selection(s) is/are taken by the time the user's priority for selection from the pool is available, the registration may proceed for a selection lower of the user's selection list. That is, a user that has a right to select from a pool of domain names may have a lower priority than other users, such that the user's first selection may be taken by the time the user gets to select from the pool. In such cases, the user's ordered list of domain names may be used to provide one or more backup selections.

According to some embodiments, the request may be made using an interface that is specifically adapted to register domain names that have been reserved through the registration of an encoding domain name. In such instances, the interface may include a field into which the user may enter the encoding domain name for the system to retrieve corresponding information for use in subsequent process steps. The system may decode the encoding domain name to retrieve a target domain name that the user intends to register, or to retrieve the identity of a pool of domain names from which the user may select a target domain name for registration. In the latter case, the user may also provide a target domain name, or ordered list of domain names indicating the user's first selection and subsequent backup selections.

At block 304, method 300 obtains a respective encoding domain name. As described above in reference to block 302, the actions of this block may be merged with the actions of block 302 according to some embodiments. That is, according to some embodiments, the user provides both a target domain name (or an identification of a pool of domain names) and a corresponding encoding domain name at block 302. Such embodiments are particularly suited for encoding domain names that identify a pool of domain names from which the user selects a target domain name. According to other embodiments, method 300 itself obtains an encoding domain name that corresponds to the user-supplied target domain name (or ordered list of domain names) of block 302. Method 300 may accomplish this by searching the repository of data from encoding domain names that is stored separately from the DNS resource record data per block 206 of FIG. 2. The searching may match a target domain name with an encoding domain name by searching for the target domain name string within a particular row or field of the stored encoding domain name data. Alternately, or in addition, the system may automatically retrieve all encoding domain names that affect the registration of the target domain name, e.g., including encoding domain names for pools that include the user-provided target domain name of list or names. According to some embodiments, method 300 searches DNS resource record data to obtain an encoding domain name that corresponds to the target domain name instead of, or in addition to, searching the separate store of encoding domain name data.

At block 306, method 300 decodes information from the encoding domain name obtained at block 304. The decoding may include parsing the encoding domain name to determine the information in designated fields. The decoding may include determining the rights conferred by the registration of the encoding domain name. The decoding may include determining a target domain name or pool of domain names affected by the encoding domain name. Other information may be extracted from the encoding domain name per block 306. Decoding may also involve re-encoding certain data to confirm that the encoding domain name is associated with a target domain name and/or pool according to the various embodiments, e.g., reapplying a cryptographic hash function, optionally with a random number, or reapplying a tokenizing function.

At block 308, method 300 determines whether the conditions for registering the target domain name are satisfied. There may be multiple conditions that must be satisfied before registration can proceed. In general, the conditions may be of four different types: reservation conditions, timing conditions, availability conditions, and membership conditions.

Reservation conditions concerns whether the encoding domain name of block 304 properly reserves a right to register the target domain name of block 302. Reservation conditions may be verified by comparing the results of the decoding of block 306 to the target domain name received at block 302. If the decoding domain name properly identifies the target domain name and an associated right to register it, then the reservation conditions are satisfied. Otherwise, the reservation conditions may not be satisfied. Note that the encoding domain name may encode the identity of a pool of domain names. In such instances, the reservation conditions are satisfied if the target domain name of block 302 is among the identified pool of domain names.

Timing conditions concern whether the request to register the target domain name complies with the temporal event information indicated by the encoding domain name. For encoding domain names that encode a right to register a domain name that is currently registered to another user, the timing conditions may include that the request be received prior to an agreed-upon relinquishment date and time. For encoding domain names that encode a right to register a domain name upon its deletion, or for encoding domain names that encode a right to select and register a domain name from a pool of deleted domain names, the timing conditions may include that the request of block 302 be received during a "pending delete" period set by the registry. Similarly, for encoding domain names that encode a right to select and register a target new top-level domain name, the timing conditions may include that the request of block 302 be received during a predefined time period prior to the release date.

Availability conditions concern whether the encoding domain name is properly available. Thus, availability conditions may include verifying that a current registrant of a target domain name has agreed to relinquish registration, and that the current registrant has actually relinquished registration. A particular category of availability conditions concern whether other aspiring registrants of the target domain with higher priorities have chosen to register the target domain name. If another user with a higher priority to register the target domain name chooses to exercise his or her reservation of the target domain name by way of a respective encoding domain name, then the respective availability condition is not satisfied; otherwise it is. Thus, availability conditions include ensuring that priority of selection is properly handled.

Membership conditions are related to encoding domain names that encode a right to select a target domain name from a pool. Membership conditions concern whether the target domain name is both present in the pool indicated by the encoding domain name and available to be registered. Note that such membership conditions are typically satisfied prior to the satisfaction of the availability conditions that concern whether another user with a higher priority already requested registration of the target domain name. In other words, membership conditions are distinct from availability conditions that concern priority.

If all the necessary conditions of block 308 are satisfied, then control may pass to block 310. Otherwise, control may pass to block 312.

At block 310, if at least one condition of block 308 is not satisfied, then the user is informed that the registration failed. The user may be informed by a display on a website that hosts the user interface used to request registration at block 302, for example. Other informing techniques may be used in addition or in the alternative, such as email.

At block 312, if the conditions of block 308 are satisfied, then the target domain name is registered to the requesting user. The registration may proceed according to normal registration techniques, with an appropriate registry recording master resource records reflecting the successful registration.

Figure 4:
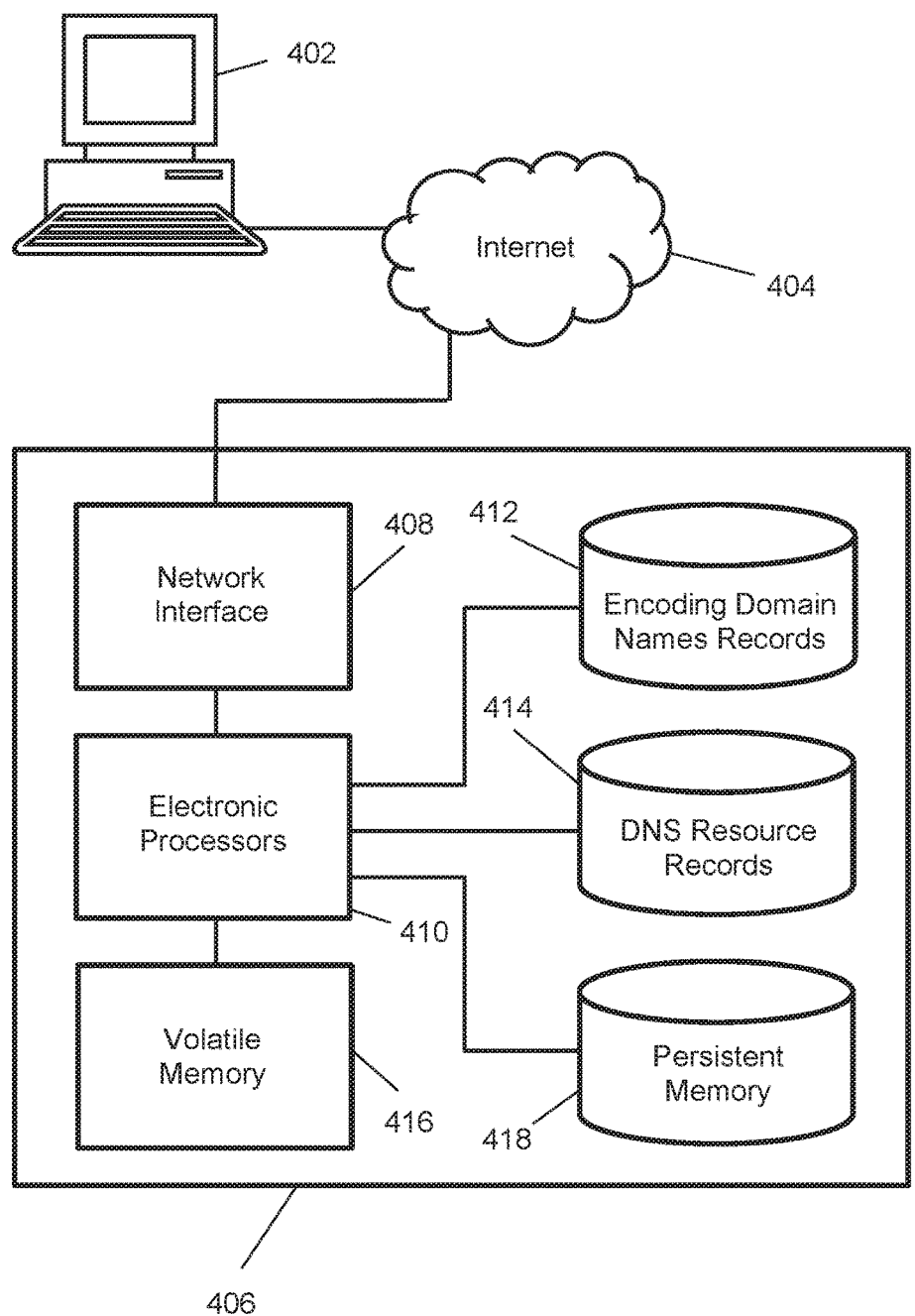
FIG. 4 is a schematic diagram of a system according to some embodiments.

FIG. 4 is a schematic diagram of a system according to some embodiments. The system may be based around an electronic hardware internet server computer 406, which may be communicatively coupled to the internet 404. Server computer 406 includes network interface 408 to affect the communicative coupling to the internet 404. Network interface 408 may include a physical network interface, such as a network adapter. Server computer 408 may be a special-purpose computer, adapted for reliability and high-bandwidth communications. Thus, server computer 408 may be embodied in a cluster of individual hardware server computers, for example. Alternately, or in addition, server computer 408 may include redundant power supplies. Persistent memory 418 may be in a Redundant Array of Inexpensive Disk drives (RAID) configuration for added reliability, and volatile memory 416 may be or include Error-Correcting Code (ECC) memory hardware devices. Server computer 408 may further include one or more electronic processors 410, which may be multi-core processors suitable for handling large amounts of information. Electronic processors 410 are communicatively coupled to persistent memory 118, and may execute instructions stored thereon to effectuate the techniques disclosed herein for client computer 402, e.g., as shown and described in reference to FIGS. 2 and 3. Electronic processors 410 are also communicatively coupled to volatile memory 416. System 406 further includes encoding domain name persistent memory 412 for storing encoding domain name records separate from the DNS resource records stored in DNS resource record persistent memory 412. Note that DNS resource record persistent memory 414 is optionally included in some embodiments.

Although the embodiments have been described in terms of domain names and the DNS name space, the methods set forth may also be applied to the registration of objects in other name spaces. For example, references herein to "encoding domain name" may be broadened to "encoding object identifier", where the object identifier is specified in a non-DNS name space, e.g., an IP address, a social media identifier, a Digital Object Architecture handle, a public key, or a block chain transaction and/or address, specially defined to be associated with a target domain name or pool. The encoding object identifier may then be registered in the non-DNS name space to indicate a registrant's intent to register a target domain name or a domain name in a pool. As another example, references herein to "target domain name" may be broadened to "target object identifier", where the object identifier is specified in such a non-DNS name space. The encoding domain name may be registered in the DNS name space to indicate a registrant's intent to register a target object identifier in the non-DNS name space. Similarly, references to "pool" may be broadened to "class" or "set" of objects in a non-DNS name space. (As one example, the "set" could include applications for new top-level domains, and the "priority" could be the order in which applications are evaluated, or in which evaluation order is selected.) More generally, "encoding object identifiers" in non-DNS name spaces may be broadened to refer to "target object identifiers" and "pools" in non-DNS name spaces.

Note that the set of object identifiers suitable as "encoding object identifiers" may be different than the set suitable as "target object identifiers," given that the former may also include various data fields such as described above. In addition, although described such that an encoding domain name refers to a single target domain name or pool, the methods may be generalized such that an encoding domain name or encoding object identifier may refer to two or more target domain names, target identifiers, pools, classes or sets, or a combination of two or more of any of such items.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of facilitating registration of a target domain name with the domain name system (DNS), the method comprising:
   receiving a request to register an encoding domain name with the DNS, the encoding domain name comprising an indication of a temporal event and of a pool of domain names;
   registering the encoding domain name to a registrant, wherein the registering the encoding domain name confers to the registrant a right to register a target domain name of the registrant's selection from the pool of domain names upon a specified condition, wherein the specified condition comprises an occurrence of the temporal event;
   receiving a request initiated by the registrant to register the target domain name; and
   registering the target domain name to the registrant after satisfaction of the specified condition.

2. The method of claim 1, wherein the temporal event comprises expiration of prior registrations of domain names in the pool of domain names.

3. The method of claim 1, wherein the specified condition further comprises prior registrants of domain names in the pool of domain names agreeing to relinquish registration of the domain names in the pool of domain names.

4. The method of claim 1, wherein at least one user distinct from the registrant has a right to register a domain name of the at least one user's selection from the pool of domain names with a higher priority than a priority of the registrant's right to register a target domain name of the registrant's selection from the pool of domain names; and wherein the specified condition further comprises the at least one user not requesting to register the target domain name.

5. The method of claim 1, wherein the indication of the temporal event and of the pool of domain names comprises a reference to a database entry, wherein the database entry comprises an identification of the pool of domain names and an identification of the temporal event.

6. The method of claim 1, wherein the indication of the temporal event and of the pool of domain names comprises a cryptographic hash of data comprising an identification of the pool of domain names and an identification of the temporal event.

7. The method of claim 1, wherein the temporal event comprises a time of a release of new domain names for registration.

8. The method of claim 1, wherein the indication of the temporal event and of the pool of domain names comprises a tokenization of at least one of: an identification of the pool of domain names or an identification of the temporal event.

9. The method of claim 1, wherein the specified condition further comprises a passing of the temporal event.

10. The method of claim 1, wherein the specified condition further comprises not passing the temporal event.

11. A system for facilitating registration of a target domain name with the domain name system (DNS), the system comprising:
a first network interface configured to receive a request to register an encoding domain name with the DNS, the encoding domain name comprising an indication of a temporal event and of a pool of domain names;
at least one electronic processor communicatively coupled to a DNS registry and configured to register the encoding domain name to a registrant using the DNS registry, wherein registering the encoding domain name confers to the registrant a right to register a target domain name of the registrant's selection from the pool of domain names upon a specified condition, wherein the specified condition comprises an occurrence of the temporal event;
a second network interface configured to receive a request initiated by the registrant to register the target domain name; and
at least one electronic processor communicatively coupled to a DNS registry and configured to register the target domain name to the registrant using the DNS registry after satisfaction of the specified condition.

12. The system of claim 11, wherein the temporal event comprises expiration of prior registrations of domain names in the pool of domain names.

13. The system of claim 11, wherein the specified condition further comprises prior registrants of domain names in the pool of domain names agreeing to relinquish registration of the domain names in the pool of domain names.

14. The system of claim 11, wherein at least one user distinct from the registrant has a right to register a domain name of the at least one user's selection from the pool of domain names with a higher priority than a priority of the registrant's right to register a target domain name of the registrant's selection from the pool of domain names; and wherein the specified condition further comprises the at least one user not requesting to register the target domain name.

15. The system of claim 11, wherein the indication of the temporal event and of the pool of domain names comprises a reference to a database entry, wherein the database entry comprises an identification of the pool of domain names and an identification of the temporal event.

16. The system of claim 11, wherein the indication of the temporal event and of the pool of domain names comprises a cryptographic hash of data comprising an identification of the pool of domain names and an identification of the temporal event.

17. The system of claim 16, wherein the temporal event comprises a time of a release of new domain names for registration.

18. The system of claim 11, wherein the indication of the temporal event and of the pool of domain names comprises a tokenization of at least one of: an identification of the pool of domain names or an identification of the temporal event.

19. The system of claim 11, wherein the specified condition further comprises a passing of the temporal event.

20. The system of claim 11, wherein the specified condition further comprises not passing the temporal event.

* * * * *